Patented Dec. 6, 1932

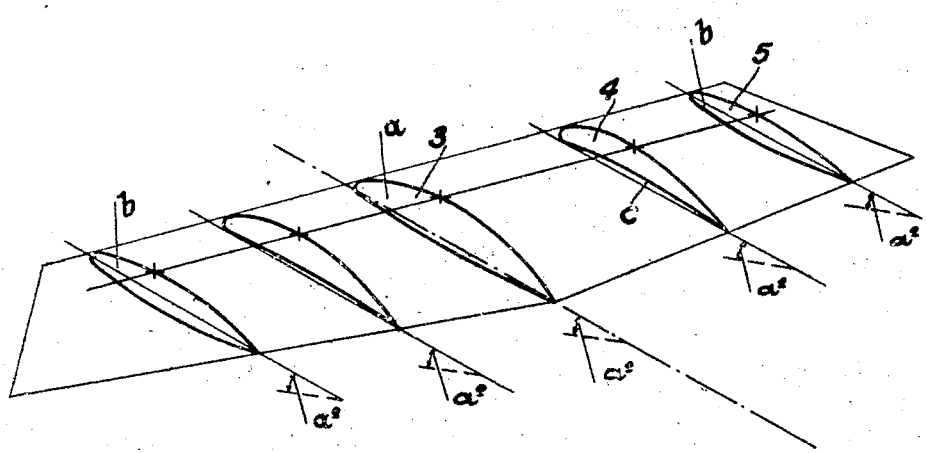

1,890,079

UNITED STATES PATENT OFFICE

HENRICH FOCKE, OF BREMEN, GERMANY

AIRCRAFT WING

Application filed May 14, 1930, Serial No. 452,405, and in Germany February 27, 1930.

It is known to make aircraft wings of high transverse stability by making the wings twist from the center of aircraft outwards, that is to say, with decreasing angle of inclination by bending the wing tips up sideways or slopingly towards the back (dove form), by using a dihedral angle or by fitting additional surfaces directed upwards in the shape of a V to the wing ends. Twisted and dihedral position of wing does indeed produce a certain transverse stability which however does not extend up to very high angles of incidence and does not exclude the risk of spinning. When the wings have a decreasing angle of inclination from the center of the aircraft outwards, a very high transverse stability is obtained but also very bad properties as regards the ratio of lifting power to the resistance of the wing. In the construction of airplane wings it has previously been proposed to form the top of the planes along a straight horizontal line.

The present invention, as proved by experiments, not only produces high transverse stability up to complete safety against spinning, but also a more than normal ratio of lifting power to resistance, along with high maximum lifting power.

According to the present invention an aircraft wing without upward bent and twisted portions and with the highest profile points situated in a straight horizontal line and of decreasing vertical thickness is constructed so that at the same angle of inclination the median transverse curvature of the lower surface decreases from the center of the aircraft to points spaced from the ends of the wing and from said points increases to the ends of the wing.

The thick wing selected, tapering towards the ends of the wing, has neither V shape (at least not on the top face) nor twist.

Referring now to the accompanying drawing in which a wing is shown diagrammatically, the upper surface of the wing continues from end to end thereof and the angle of inclination of the lower surface to the fuselage is constant from the central profile (a) to the outermost or end profiles (b) at the tips of the wing. The vertical thickness and intermediate line curvature of the wing profile on the contrary falls off from the center towards the ends of the wing. It will be noted that the central transverse profile 3 of the plane is convex on the upper and lower sides and is somewhat flattened on its lower convex surface. Each outer end cross sectional profile 5 of the plane, while of less vertical extent than that of the central profile 3, is also convex both on the upper and lower sides and the curvature of the lower convex surface is somewhat greater than that of the central cross sectional profile 3. Each intermediate cross sectional profile 4 of the plane is, however, convex on the upper side and somewhat concave on the lower side as at $c$. Hence the sections of the plane alternately vary in profile on the lower side as from convex at 3 to concave at 4 and from concave at 4 to convex at 5, thus greatly improving the aerodynamic conditions and greatly decreasing the resistance effect of the plane. The wing surface thus resulting, which is not twisted and not bent upwards in the sense of the geometric-aerodynamic definition, nevertheless produces a higher transverse stability than has ever been obtained heretofore.

Having now particularly described and ascertained the nature of my said invention, and in what manner the same is to be performed, I declare that what I claim is:

An aircraft wing, the highest profile points of which are situated in a straight horizontal line from end to end, said wing decreasing in vertical thickness from the center towards each end and the transverse curvature thereof first increasing and then decreasing from center to tip, all profile sections being at the same angle of incidence with respect to the horizontal plane of the horizontal axis of the fuselage, the central and outer end cross sectional profile of the plane being convex both on the upper and lower sides, and the intermediate cross sectional profiles of the plane being convex on the upper side and concave on the lower side.

In testimony whereof I have hereunto set my hand this 28th day of April, A. D. 1930.

HENRICH FOCKE.